United States Patent
Zhou et al.

(10) Patent No.: US 12,199,320 B2
(45) Date of Patent: *Jan. 14, 2025

(54) SUPPORT MEMBERS FOR FUEL CELL FLUID FLOW NETWORKS

(71) Applicant: Toyota Motor Engineering & Manufacturing North America, Inc, Plano, TX (US)

(72) Inventors: Yuqing Zhou, Ann Arbor, MI (US); Ercan M. Dede, Ann Arbor, MI (US)

(73) Assignee: TOYOTA MOTOR ENGINEERING AND MANUFACTURING NORTH AMERICA, INC., Plano, TX (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/085,822

(22) Filed: Oct. 30, 2020

(65) Prior Publication Data

US 2022/0140362 A1    May 5, 2022

(51) Int. Cl.
*H01M 8/0267* (2016.01)
*H01M 8/0258* (2016.01)
*H01M 8/04007* (2016.01)
*H01M 8/04701* (2016.01)

(52) U.S. Cl.
CPC ....... *H01M 8/0267* (2013.01); *H01M 8/0258* (2013.01); *H01M 8/04074* (2013.01); *H01M 8/04701* (2013.01)

(58) Field of Classification Search
CPC ............ H01M 8/0254; H01M 8/0258; H01M 8/0267; H01M 8/04074; H01M 8/04701; Y02E 60/50
See application file for complete search history.

(56) References Cited

U.S. PATENT DOCUMENTS

| | | | |
|---|---|---|---|
| 6,555,261 B1 * | 4/2003 | Lewinski | H01M 4/926 |
| | | | 429/513 |
| 6,838,202 B2 | 1/2005 | Brady et al. | |
| 8,535,845 B2 | 9/2013 | Rock et al. | |

(Continued)

FOREIGN PATENT DOCUMENTS

| | | | |
|---|---|---|---|
| CN | 100466351 C | * | 3/2009 |
| CN | 101944618 A | * | 1/2011 |

(Continued)

OTHER PUBLICATIONS

Yu, Ha Na, In Uk Hwang, and Seong Su Kim. "Integrated carbon composite bipolar plate for polymer-electrolyte membrane fuel cells." Journal of Power Sources 189.2 (2009): 929-934 (Year: 2009).*

Bhosale, Amit C., Manthan A. Mahajan, and Prakash C. Ghosh. "Optimization of contact resistance with better gasketing for a unitized regenerative fuel cell." International Journal of Hydrogen Energy 44.37 (2019): 20953-20962. (Year: 2018).*

CN110120530A, Cui, et al., "Composite metal fuel cell bipolar plate with air permeability and preparation method", machine English translation from PE2E, retrieved Sep. 28, 2022 (Year: 2019).*

(Continued)

*Primary Examiner* — Matthew T Martin
*Assistant Examiner* — Jared Hansen
(74) *Attorney, Agent, or Firm* — Jordan IP Law, LLC

(57) ABSTRACT

A fuel cell may include a first fuel cell bipolar plate defining an air layer, a second fuel cell bipolar plate defining a hydrogen layer, and a coolant layer defined by the air layer and the hydrogen layer. The coolant layer includes a plurality of coolant microchannels that facilitate flow of a coolant. One or more support members are to extend between the air layer and the hydrogen layer to define one or more additional coolant flow paths between the air layer and the hydrogen layer.

10 Claims, 7 Drawing Sheets

(56) References Cited

U.S. PATENT DOCUMENTS

| | | | |
|---|---|---|---|
| 2002/0114990 A1* | 8/2002 | Fly | H01M 8/2418 |
| | | | 429/514 |
| 2004/0033410 A1* | 2/2004 | Brady | B32B 15/01 |
| | | | 428/615 |
| 2013/0202989 A1* | 8/2013 | Fly | H01M 8/00 |
| | | | 429/535 |
| 2014/0220473 A1* | 8/2014 | Cole | H01M 8/021 |
| | | | 429/514 |
| 2017/0110739 A1* | 4/2017 | Andreas-Schott | H01M 8/241 |
| 2021/0226227 A1* | 7/2021 | Gu | H01M 8/242 |

FOREIGN PATENT DOCUMENTS

| | | | | | |
|---|---|---|---|---|---|
| CN | 110120530 A | * | 8/2019 | | |
| CN | 111293325 B | * | 8/2020 | | H01M 8/0258 |
| EP | 4145573 A1 | * | 3/2023 | | H01M 8/0258 |

OTHER PUBLICATIONS

CN101944618A, Tao, et al., "Tree-structured flow field proton exchange membrane fuel cell bipolar plate", machine English translation, retrieved from https://worldwide.espacenet.com/ Date: Nov. 1, 2023 (Year: 2011).*

CN100466351C, Xinmin, et al., "Proton exchange film fuel battery dual-pole board based on thin plate punching", machine English translation, retrieved from https://worldwide.espacenet.com/ Date: Nov. 1, 2023 (Year: 2009).*

* cited by examiner

SUPPORT MEMBERS FOR FUEL CELL FLUID FLOW NETWORKS

TECHNICAL FIELD

Embodiments relate generally to a fuel cell (FC), and one or more methods of fabricating an (FC).

BACKGROUND

Hydrogen fuel cell (FC) technology has been utilized widely in a variety of stationary and non-stationary applications, e.g., space transport, satellites, motor vehicles, power generation, and electronics. The FC device converts chemical potential energy into electrical energy.

A FC stack generally comprises hundreds of FCs arranged in a stack formation. Each fuel cell comprises a hydrogen layer defined by a hydrogen plate having a plurality of channels for facilitating hydrogen flow into a reaction zone, an air layer defined by an air plate having a plurality of channels for facilitating air flow into the reaction zone, and a coolant layer defined by superposition or stacking of the hydrogen plate on the air plate. The hydrogen plate and the air plate may be fabricated by a stamping process to provide the plurality of channels.

The MEA is as a proton exchange membrane (PEM) cell having sides coated with a catalyst for the hydrogen oxidation (anode) and oxygen reduction (cathode). Gas diffusion layers (GDL) are used to deliver the reactant fuels to the electrodes from bipolar plate microchannels.

In operation, a first fuel reactant, for example, hydrogen ($H_2$), is supplied to the anode via a hydrogen layer, and a second fuel reactant, for example, oxygen ($O_2$) is supplied to the cathode via an air layer. Hydrogen and air enter the FC stack and mix within the reaction region of the MEA and flow through microchannels formed in the hydrogen layer and the air layer to produce electricity, with water and heat as reaction byproducts. Additionally, coolant also enters and exits the FC stack and flows outside of the reaction zones within coolant microchannels defined by the opposite sides of the hydrogen plate and the air plate.

Due to the discrete nature of the microchannels, a majority of the coolant layer can be blocked due to direct contact between the hydrogen plate and the air plate. For example, when a hydrogen channel is vertically aligned with an air channel, the coolant layer can be blocked at this location. This may, in turn, reduce the coolant flow within the coolant layer, which adversely effects the performance of the FC. In some regions, however, the coolant microchannels are very narrow or completely blocked, while in other regions the coolant microchannels are wide and open. This may lead to non-uniform thermal management throughout the FC stack, and consequently, inefficient FC stack performance.

BRIEF SUMMARY

In accordance with one or more embodiments, one or more support members are strategically positioned to extend between an air plate and a hydrogen plate to prevent blockage in the coolant microchannels, particularly in regions where there is direct contact between the air plate and the hydrogen plate. The support members can be strategically positioned between the air plate and the hydrogen plate in regions of the fuel cell where there is no air microchannel and no hydrogen microchannel.

Each support member may have an overall length that is greater than the combined microchannel depths of the air layer and the hydrogen layer. In that way, the support members provide designed coolant layer permeability.

The support members are configured to facilitate a clear path for coolant flow within the coolant layer by ensuring spacing or a gap between the air layer and the hydrogen layer. This provides more uniform thermal management throughout the FC stack, and particularly, enhanced and consistent performance by the FC stack.

The support members can be composed of one or more thermally conductive materials to enhance the overall thermal management of the FC. In that way, the support members can define a thermally conductive path between the air layer and the hydrogen layer. In particularly, the thermally conductive path may be provided between an actively cooled region of a plate and a hot region of another plate.

In accordance with one or more embodiments, a fuel cell may comprise one or more of the following: a first fuel cell bipolar plate defining an air layer, a second fuel cell bipolar plate defining a hydrogen layer, and a coolant layer defined by the air layer and the hydrogen layer. The coolant layer includes a plurality of coolant microchannels that facilitate flow of a coolant. One or more support members are to extend between the air layer and the hydrogen layer to define additional coolant microchannels between the air layer and the hydrogen layer.

In accordance with one or more embodiments, a fuel cell may comprise one or more of the following: a first fuel cell bipolar plate defining an air layer having a plurality of air microchannels that facilitate flow of air therethrough; a second fuel cell bipolar plate defining a hydrogen layer having a plurality of hydrogen microchannels that facilitate flow of hydrogen therethrough; a coolant layer, defined by stacking the air layer and the hydrogen layer, having a plurality of coolant microchannels that facilitate flow of a coolant therethrough for thermal management of the fuel cell; and one or more support members, composed of one or more thermally conductive materials and configured to extend between the air layer, to define a thermally conductive path and additional coolant microchannels between the air layer and the hydrogen layer.

In accordance with one or more embodiments a method of fabricating a fuel cell may comprise one or more of the following: identifying one or more regions of fluid flow blockage between the first fuel cell bipolar plate defining an air layer and a second fuel cell bipolar plate defining a hydrogen layer; and defining one or more gaps between the air layer and the hydrogen layer by positioning one or more support members at the identified one or more regions.

In accordance with one or more embodiments a method of fabricating a fuel cell may comprise one or more of the following: identifying regions of direct contact between an air layer and a hydrogen layer; and positioning one or more support members at the identified one or more regions to define one or more coolant microchannels.

In accordance with one or more of the methods, the one or more support members can be strategically positioned between the air layer and the hydrogen layer at the identified regions where there is no air microchannel and no hydrogen microchannel.

In accordance with one or more of the methods, each support member may have an overall length that is greater than the combined channel depths of the air layer and the hydrogen layer.

In accordance with one or more embodiments a method of fabricating a fuel cell may comprise one or more of the following: identifying one or more regions of fluid flow blockage or direct contact between the air layer and the hydrogen layer; forming one or more support members having an overall length that is greater than the combined channel depths of the air layer and the hydrogen layer; and defining one or more coolant gaps between the air layer and the hydrogen layer by positioning the one or more support members at the identified one or more regions.

In accordance with one or more of the methods, the one or more support members can be strategically positioned between the air layer and the hydrogen layer in the identified regions where there is no air microchannel and no hydrogen microchannel.

In accordance with one or more embodiments a method of fabricating a fuel cell may comprise one or more of the following: identifying one or more regions of fluid flow blockage or direct contact between the air layer and the hydrogen layer; forming one or more support members having a thermally conductive material composition and an overall length that is greater than the combined channel depths of the air layer and the hydrogen layer; and defining one or more gaps and thermally conductive paths between the air layer and the hydrogen and one or more coolant microchannels by positioning the one or more support members at the identified one or more regions to prevent flow blockage at the coolant layer and facilitate heat transfer between the air layer and the hydrogen layer.

In accordance with one or more of the methods, the one or more support members can be strategically positioned between the air layer and the hydrogen plate in the identified regions where there is no air microchannel and no hydrogen microchannel.

In accordance with one or more embodiments a method of fabricating a fuel cell may comprise one or more of the following: identifying one or more regions of direct contact between the air layer and the hydrogen layer; forming one or more support members having a thermally conductive material composition; and defining one or more gaps and thermally conductive paths between the air layer and the hydrogen layer and one or more coolant microchannels by positioning the one or more support members at the identified one or more regions to prevent flow blockage at the coolant layer and facilitate heat transfer between the air layer and the hydrogen layer.

In accordance with one or more of the methods, the one or more support members can be strategically positioned between the air layer and the hydrogen layer to also define one or more coolant microchannels.

In accordance with one or more of the methods, the one or more support members can be strategically positioned between the air layer and the hydrogen layer in the identified regions where there is no air microchannel and no hydrogen microchannel.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
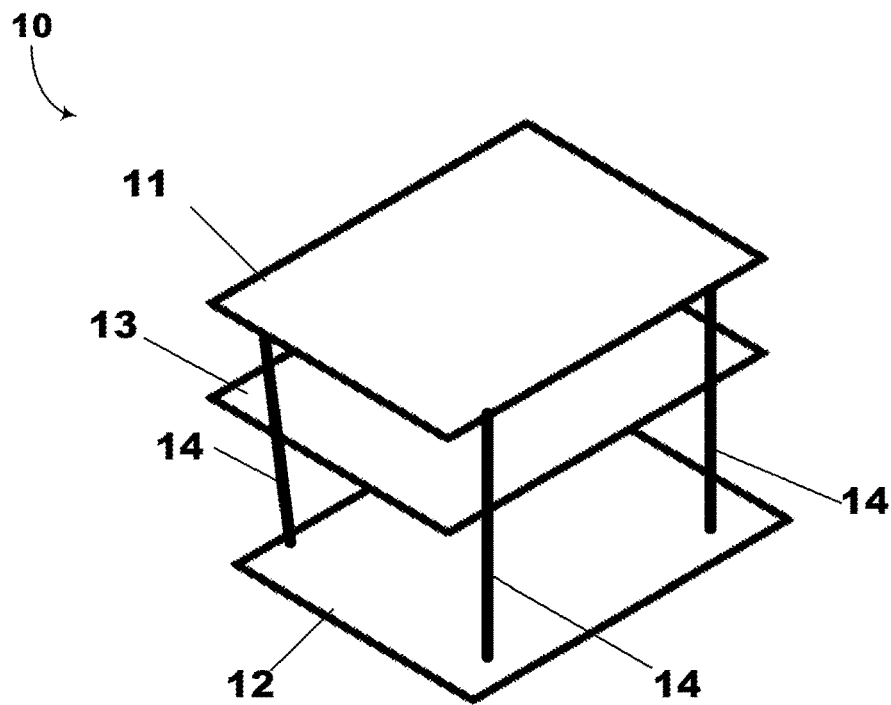
FIG. 1 illustrates an example multi-layered fluid flow network of a fuel cell, in accordance with one or more embodiments shown and described herein.
Figure 2:
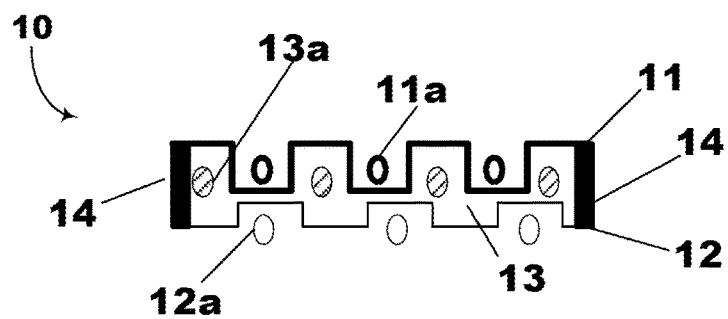
FIG. 2 illustrates a cross-sectional view of an example multi-layered fluid flow network of a fuel cell, in accordance with one or more embodiments shown and described herein.

As illustrated in FIGS. 1 and 2, a fuel cell 10 comprises a first bipolar plate defining an air layer 11, a second bipolar plate defining a hydrogen layer 12. The air layer 11 comprises a plurality of independently formed air fluid flow network or microchannels 11a, and the hydrogen layer 12 comprises a plurality of independently formed hydrogen fluid flow network or microchannels 12a. Through the superimposition or stacking of the air plate 11 and the hydrogen plate 12, a coolant layer 13 comprising a plurality of coolant flow network or microchannels 13a is defined. In this way, the coolant fluid flow network or microchannel configuration 13a is dependent upon the independently-formed air microchannels 11a and hydrogen microchannels 12a.

In accordance with one or more embodiments, to prevent blockage in the coolant microchannels 13a, particularly in regions where there is direct contact between the air plate 11 and the hydrogen plate 12, one or more support members 14 are strategically positioned between the air plate 11 and the hydrogen plate 12. For example, the support members 14 can be strategically positioned or arranged between the air plate 11 and the hydrogen plate 12 in regions where there is no air microchannel 11a and no hydrogen microchannel 12a.

Figure 3:
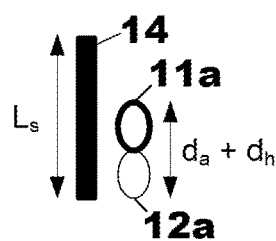
FIG. 3 illustrates a support member for a FC bipolar plate, in accordance with one or more embodiments shown and described herein.

As illustrated in FIG. 3, the overall length $L_s$ of each support member 14 is greater than the combined channel depths $d_a+d_h$ of the air layer 11 and the hydrogen layer 12. In that way, the support member 14 is to provide designed coolant layer 13 permeability. Such a structural configuration and strategic positioning of the one or more support members 14 is to define a gap (that serves as a coolant microchannel 13a) between the air plate 11 and the hydrogen plate 12, even in regions where an air channel 11a and a hydrogen channel 12a are vertically aligned. The one or more support members 14 thereby facilitates a clear path for coolant flow within the coolant layer 13 by ensuring a gap between the air layer 11 and the hydrogen layer 12. Such an arrangement, therefore, provides more uniform thermal management throughout the FC stack, which, in turn, results in enhanced and consistent performance by the FC stack.

The illustrated embodiments show the support members 14 as separate and distinct components from the air plate 11 and the hydrogen plate 12. Embodiments, however, are not limited thereto, and thus, this disclosure contemplates any suitable structural configuration between the support members 14 and the air plate 11 and the hydrogen plate 12 that fall within the spirit and scope of the principles of this disclosure set forth herein. For example, the support members 14 can be co-stamped plate features that are stamped in the air plate 11 and/or the hydrogen plate 12.

Figure 4:
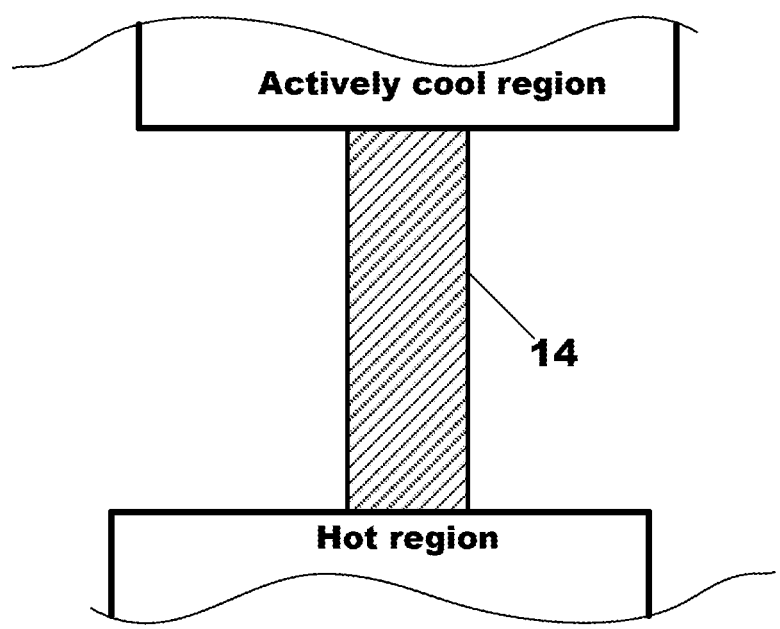
FIG. 4 illustrates a thermally conductive pathway defined by a support member for a FC bipolar plate, in accordance with one or more embodiments shown and described herein.

As illustrated in FIG. 4, in accordance with one or more embodiments, the one or more support members 14 can be composed of one or more thermally conductive materials to enhance the overall thermal management of the FC. In that way, the one or more support members 14 can define a thermally conductive path between an actively cooled region of a plate and a hot region of another plate.

FIGS. 5 to 9 illustrate flowcharts of methods 100, 200, 300, 400, 500 for fabricating an FC, in accordance with embodiments. Each method 100, 200, 300, 400, 500 is to yield an optimized design of an FC having microchannel configurations that reduce the overall size of the FC. Moreover, each method 100, 200, 300, 400, 500 is to yield an optimized design of a FC bipolar plate having enhanced operational performance by facilitating more uniform thermal management of the MEA at the cooling layer. Such uniform thermal management, in turn, facilitates more uniform reactions at the MEA that in turn, maximizes the generation of electricity by the FC stack.

The flowchart of each respective method 100, 200, 300, 400, 500 corresponds to the schematic illustrations of FIGS. 1 to 4 which are set forth and described herein. In accordance with embodiments, each method 100, 200, 300, 400, 500 may be implemented, for example, using logic instructions (e.g., software), configurable logic, fixed-functionality hardware logic, etc., or any combination thereof. As an example, software executed on one or more computer systems may provide functionality described or illustrated herein. Each computing system respectively includes one or more processors. In particular, software executing on one or more computer systems may perform one or more fabrication or processing blocks of each method 100, 200, 300, 400, 500 described or illustrated herein or provides functionality described or illustrated herein.

Figure 5:
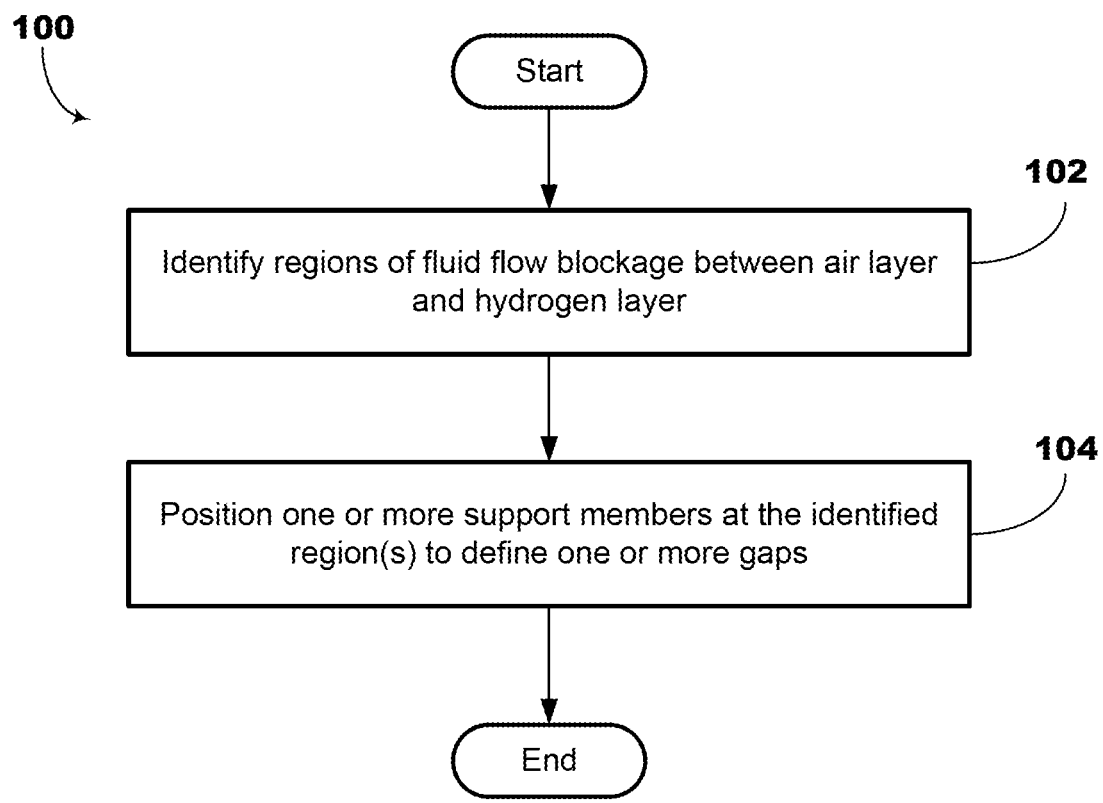
FIGS. 5 to 9 illustrate a schematic diagram of example methods of fabricating an FC, in accordance with one or more embodiments shown and described herein.

As illustrated in FIG. 5, in the method 100, illustrated processing block 102 includes identifying (e.g., in response to designing the Turing-patterned microstructures) one or more regions of fluid flow blockage between the air layer and the hydrogen layer.

The method 100 may then proceed to illustrated process block 104, which includes defining a gap between the air layer and the hydrogen layer by arranging one or more support members at the identified one or more regions to prevent flow blockage at the coolant layer and facilitate heat transfer between the air layer and the hydrogen layer.

In accordance with the method 100, the one or more support members can be strategically positioned between the air layer and the hydrogen layer in the identified regions where there is no air microchannel and no hydrogen microchannel.

In accordance with the method 100, each support member may have an overall length that is greater than the combined channel depths of the air layer and the hydrogen layer.

The method 100 can then terminate or end after completion of process block 104.

Figure 6:
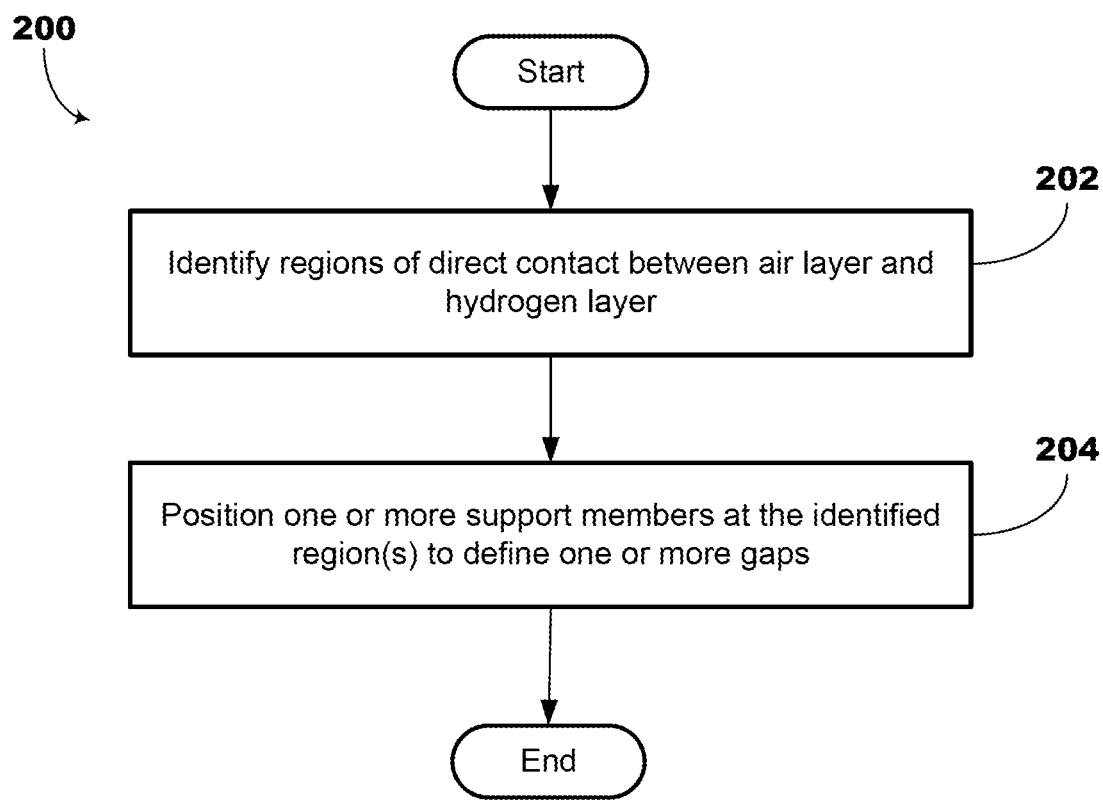

As illustrated in FIG. 6, in the method 200, illustrated processing block 202 includes identifying (e.g., in response to designing the Turing-patterned microstructures) regions of direct contact between an air layer and a hydrogen layer.

The method 200 may then proceed to illustrated process block 204, which includes positioning one or more support members at the identified one or more regions to define one or more coolant microchannels.

In accordance with the method 200, the one or more support members can be strategically positioned between the air layer and the hydrogen layer at the identified regions where there is no air microchannel and no hydrogen microchannel.

In accordance with the method 200, each support member may have an overall length that is greater than the combined channel depths of the air layer and the hydrogen layer.

The method 200 can then terminate or end after completion of process block 204.

Figure 7:
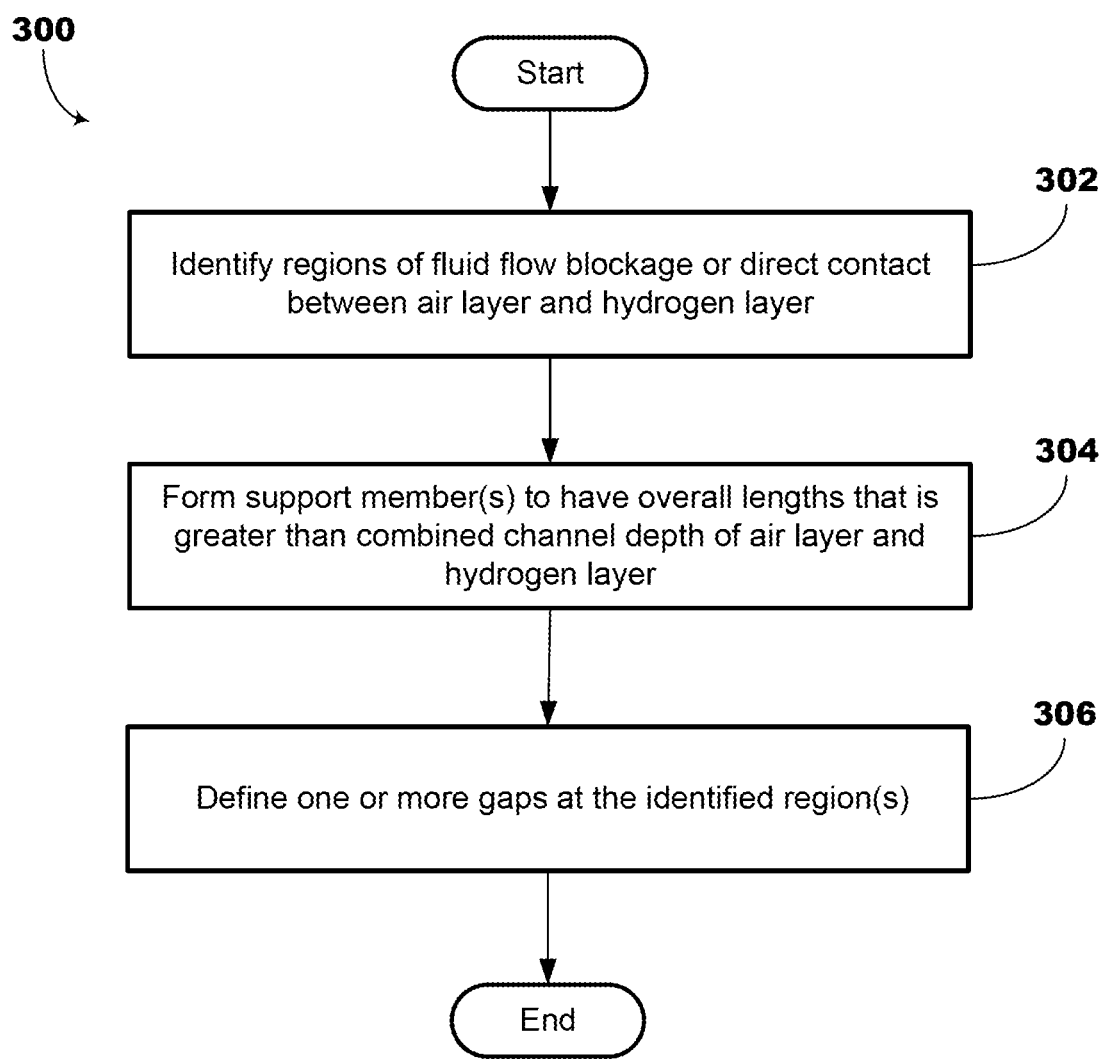

As illustrated in FIG. 7, in the method 300, illustrated processing block 302 includes identifying (e.g., in response to designing the Turing-patterned microstructures) one or more regions of fluid flow blockage or direct contact between the air layer and the hydrogen layer.

The method 300 may then proceed to illustrated process block 304, which includes forming one or more support members having an overall length that is greater than the combined channel depths of the air layer and the hydrogen layer.

The method 300 may then proceed to illustrated process block 306, which includes defining one or more gaps between the air layer and the hydrogen layer by arranging one or more support members at the identified one or more regions to prevent flow blockage at the coolant layer and facilitate heat transfer between the air layer and the hydrogen layer.

In accordance with the method 300, the one or more support members can be strategically positioned between the air layer and the hydrogen layer in the identified regions where there is no air microchannel and no hydrogen microchannel.

The method 300 can then terminate or end after completion of process block 306.

Figure 8:
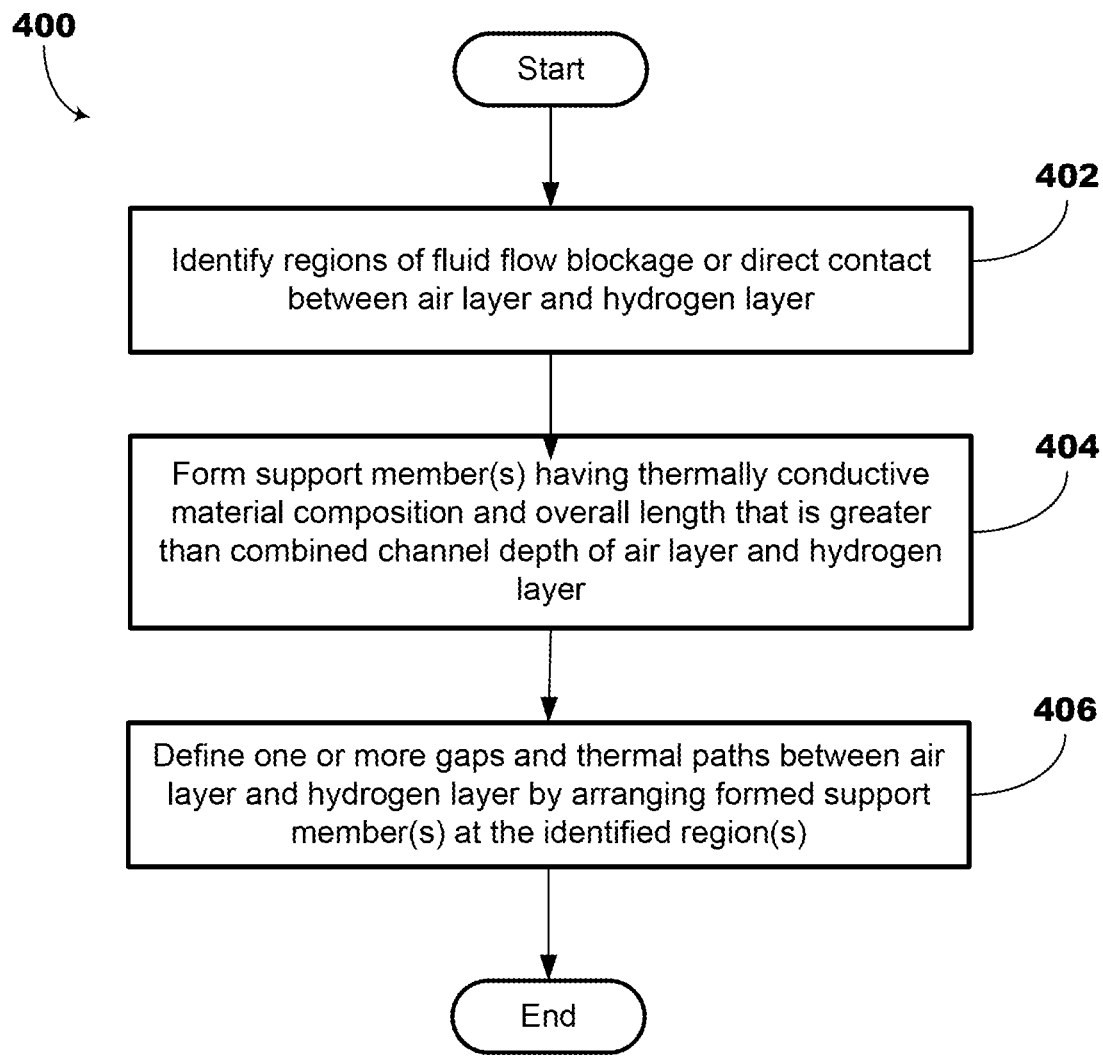

As illustrated in FIG. 8, in the method 400, illustrated processing block 402 includes identifying (e.g., in response to designing the Turing-patterned microstructures) one or more regions of fluid flow blockage or direct contact between the air layer and the hydrogen layer.

The method 400 may then proceed to illustrated process block 404, which includes forming one or more support members having a thermally conductive material composition and an overall length that is greater than the combined channel depths of the air layer and the hydrogen layer.

The method 400 may then proceed to illustrated process block 406, which includes defining one or more gaps and thermally conductive paths between the air layer and the hydrogen by arranging the one or more support members at the identified one or more regions to prevent flow blockage at the coolant layer and facilitate heat transfer between the air layer and the hydrogen layer.

In accordance with the method 400, the one or more support members can be strategically positioned between the air layer and the hydrogen plate in the identified regions where there is no air microchannel and no hydrogen microchannel.

The method 400 can then terminate or end after completion of process block 406.

Figure 9:
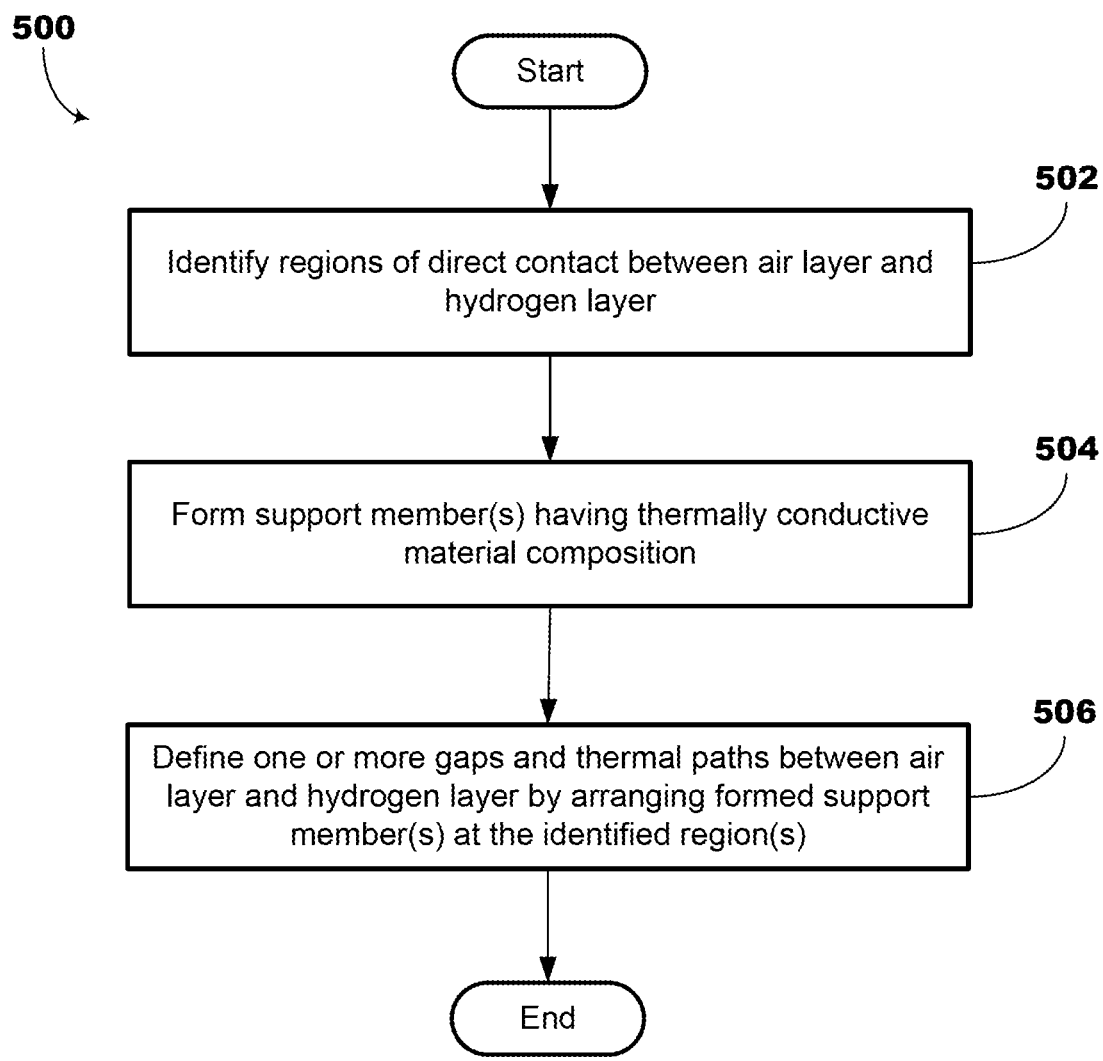

As illustrated in FIG. 9, in the method 500, illustrated processing block 502 includes identifying (e.g., in response to designing the Turing-patterned microstructures) one or more regions of direct contact between the air layer and the hydrogen layer.

The method 500 may then proceed to illustrated process block 504, which includes forming one or more support members having a thermally conductive material composition.

The method 500 may then proceed to illustrated process block 506, which includes defining one or more gaps and thermally conductive paths between the air layer and the hydrogen layer by arranging the one or more support members at the identified one or more regions to prevent flow blockage at the coolant layer and facilitate heat transfer between the air layer and the hydrogen layer.

In accordance with the method 500, the one or more support members can be strategically positioned between the air layer and the hydrogen layer to also define one or more coolant microchannels.

In accordance with the method 500, the one or more support members can be strategically positioned between the air layer and the hydrogen layer in the identified regions where there is no air microchannel and no hydrogen microchannel.

The method 500 can then terminate or end after completion of process block 506.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A fuel cell, comprising:
   a first fuel cell bipolar plate defining an air layer;
   a second fuel cell bipolar plate defining a hydrogen layer;
   a coolant layer, defined by stacking the air layer and the hydrogen layer, having a plurality of coolant microchannels that facilitate flow of a coolant therethrough; and
   one or more support members, extending between the air layer and the hydrogen layer, and positioned in a region wherein the air layer and the hydrogen layer are in direct contact and where there is no air microchannel and no hydrogen microchannel, the one or more support members defining one or more additional coolant flow paths that facilitate heat transfer between the air layer and the hydrogen layer, wherein the overall length of each support member is greater than combined channel depths of the air layer and the hydrogen layer.

2. The fuel cell of claim 1, wherein each support member has a predetermined length.

3. The fuel cell of claim 2, wherein the predetermined length is greater than a combined microchannel depth of the air layer and the hydrogen layer.

4. The fuel cell of claim 1, wherein the one or more support members are composed of one or more thermally conductive materials.

5. The fuel cell of claim 4, wherein the one or more support members define a thermally conductive path between the air layer and the hydrogen layer.

6. A fuel cell, comprising:
   a first fuel cell bipolar plate defining an air layer having a plurality of air microchannels that facilitate flow of air therethrough;
   a second fuel cell bipolar plate defining a hydrogen layer having a plurality of hydrogen microchannels that facilitate flow of hydrogen therethrough;
   a coolant layer, defined by stacking the air layer and the hydrogen layer, having a plurality of coolant microchannels that facilitate flow of a coolant therethrough for thermal management of the fuel cell; and
   one or more support members, composed of one or more thermally conductive materials and configured to extend between the air layer, and positioned in a region wherein the air layer and the hydrogen layer are in direct contact and where there is no air microchannel and no hydrogen microchannel, the one or more support members defining a thermally conductive path and one or more additional coolant flow paths that facilitate heat transfer between the air layer and the hydrogen layer, wherein the overall length of each support member is greater than combined channel depths of the air layer and the hydrogen layer.

7. The fuel cell of claim 6, wherein each support member has a predetermined length.

8. The fuel cell of claim 7, wherein the predetermined length is greater than a combined microchannel depth of the air layer and the hydrogen layer.

9. The fuel cell of claim 6, wherein the one or more support members are integrally formed as co-stamped plate features in one or more of the first fuel cell bipolar plate and the second fuel cell bipolar plate.

10. The fuel cell of claim 6, wherein each of the one or more support members are separate and distinct components from the first fuel cell bipolar plate and the second fuel cell bipolar plate.

* * * * *